United States Patent [19]
Dubuc et al.

[11] 3,774,004
[45] Nov. 20, 1973

[54] TUBING AND METHOD AND APPARATUS FOR MAKING

[75] Inventors: Rene A. Dubuc, Attleboro; Sheldon S. White, Brookline; Wesley V. Dudovicz, Attleboro, all of Mass.

[73] Assignee: Texas Instruments Incorporated, Dallas, Tex.

[22] Filed: Dec. 10, 1971

[21] Appl. No.: 206,716

[52] U.S. Cl................ 219/61, 29/497, 219/137, 219/76
[51] Int. Cl............................................ B23k 31/06
[58] Field of Search.................. 219/61, 60 A, 60 R, 219/76, 137; 29/497

[56] References Cited
UNITED STATES PATENTS

| | | | |
|---|---|---|---|
| 2,815,436 | 12/1957 | Bland | 219/76 X |
| 2,054,939 | 9/1936 | Larson | 219/76 X |
| 1,934,065 | 11/1933 | Hermanson | 219/61 |
| 2,206,375 | 7/1940 | Swift | 219/137 |
| 3,223,816 | 12/1965 | Marsden | 219/61 |
| 3,437,787 | 4/1969 | Chyle | 219/60 R X |

*Primary Examiner*—R. F. Staubly
*Assistant Examiner*—L. A. Schutzman
*Attorney*—Harold Levine et al.

[57] ABSTRACT

A tubing is formed from a composite material embodying a layer of metal such as stainless steel having a relatively high fusing temperature which is metallurgically bonded along an interface to a layer of another metal such as copper having a relatively lower fusing temperature. The composite material is arranged in a tubular configuration with the edges of the material in juxtaposed relation to each other so that corresponding edges of the metal layers and the interface in the composite are aligned with each other. The layer of metal of relatively high fusing temperature is disposed either on the interior or exterior surface of the tubing configuration as preferred. Welding heat is then applied to the surface of the tubular configuration which is formed by the layer of metal of relatively high fusing temperature, this welding heat being applied to this surface at the aligned edges of this layer of metal. In this way, the welding heat is applied to the composite material at a location spaced from the layer of metal of relatively lower fusing temperature. The rate and duration of this application of welding heat is regulated with respect to the relative thickness and thermal conductivity properties of the metal layers in the composite so that the aligned edges of the layer of metal of high fusing temperature are fused together at the noted surface of the tubular configuration with this fusion being confined to one side of the aligned interface edges of the composite so that this fusion is spaced from the other layer of metal in the composite but so that a sufficient part of this applied welding heat is conducted through the remaining unfused portion of said metal of high fusing temperature to fuse the aligned edges of the layer of metal of relatively lower fusing temperature to each other, preferably throughout the thickness of this other metal layer. Where the layer of metal of relatively high fusing temperature is located on the interior surface of the noted tubular confuguration, a novel welding torch is fitted inside the tubular configuration for applying welding heat to the aligned edges of that metal layer from inside the tubing configuration, this torch including an electrically conductive rod having a recess opening laterally of the rod and having a passage extending from one end of the rod into the recess to conduct weld-shielding inert gas to the recess, an electrode electrically connected to the rod extending upwardly from the bottom of the rod recess in spaced relation to the recess walls, electrical insulation peripherically surrounding the rod and having an aperture therein aligned with the rod recess, and means electrically connecting said one rod end to an electrical power source.

17 Claims, 9 Drawing Figures

United States Patent [19]
Dubuc et al.
[11] 3,774,004
[45] Nov. 20, 1973
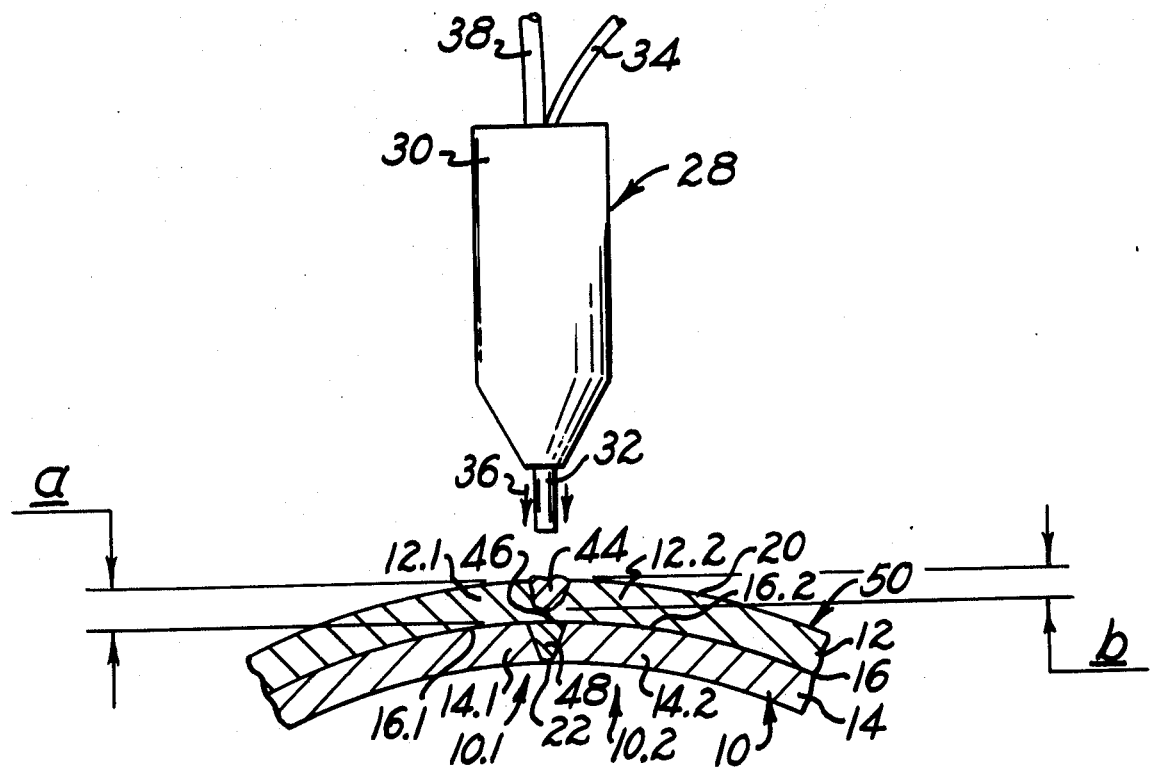

TUBING AND METHOD AND APPARATUS FOR MAKING

Welded-seam stainless steel tubing has been known for some time, such tubing being made by shaping an elongated strip of stainless steel into a tubular configuration with the lateral edges of the strip butted together to form a seam extending longitudinally along the tubing configuration and by welding this seam to form a finished tubing. Such tubing displays high strength and good reliability and formability and the process of manufacture is quite economical. However, where it has been desired to provide such a high strength tubing with an outer coating of copper to improve the heat-transfer properties of the tubing, to improve solderability of the tubing or to provide the tubing with selected corrosion-resistance properties, the coating has been added by plating the coating onto a previously welded stainless steel tubing. This plating process has added significantly to the cost of the composite tubing and the plated coating has not been fully satisfactory for its intended purposes. In this regard, it is noted that if copper and stainless steel materials were fused together in attempting to weld such materials, the resulting weld tends to be somewhat brittle and is unreliable in a tubing construction.

It is an object of this invention to provide a novel and improved composite or clad metal tubing; to provide such a tubing having a layer of stainless steel and a layer of copper; to provide such a tubing which incorporates the copper layer thereof on either the interior or exterior surface of the tubing; to provide such a tubing which displays high strength and good reliability and formability but which is characterized by relatively low cost; to provide novel and improved methods for making such tubing; to provide such methods which are economically performed; and to provide novel and improved apparatus for use in making such tubing.

Other objects, advantages and details of the tubing, methods and apparatus provided by this invention appear in the following detailed description of preferred embodiments of the inventions, the detailed description referring to the drawings in which.

Figure 1:
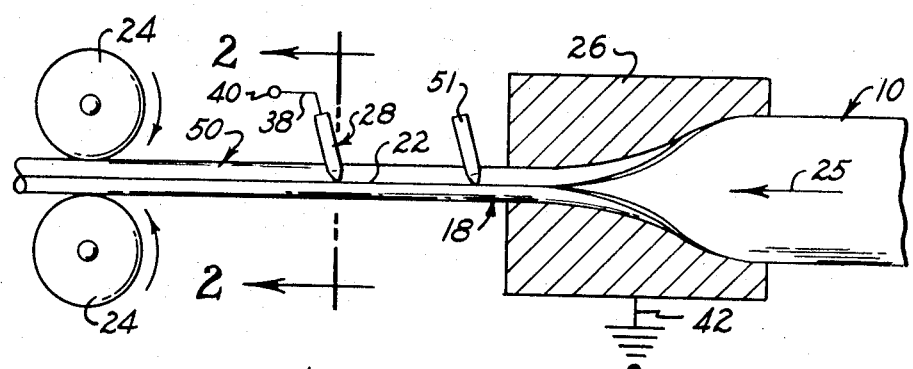
FIG. 1 is a diagrammatic view partially in section illustrating a preferred embodiment of the method of this invention.
Figure 2:
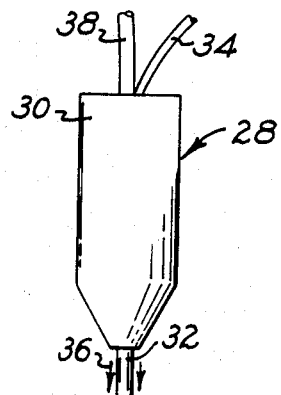
FIG. 2 is a partial section view to enlarged scale along line 2—2 of FIG. 1.

Referring to the drawings, 10 in FIGS. 1 and 2 indicates an elongated composite metal strip material embodying a layer 12 of a first metal such as an easily weldable stainless steel having selected thermal conductivity properties and a relatively high fusing or welding temperature and a layer 14 of a second metal such as copper having a relatively lower fusing temperature and preferably having relatively higher thermal conductivity properties, these metal layers having a metallurgical bond therebetween extending along an interface 16 between the metal layers. Such composite materials are well known and are readily manufactured at low cost by conventional roll-bonding or pressure-welding techniques and the like. In such composite strip materials, the metallurgical bond between the metal layers preferably extends substantially throughout the interface 16 between the metal layers and preferably comprises a solid-phase, metallurgical bond so that the interface 16 is substantially free of any embrittling intermetallic compounds such as might tend to cause the material layers to separate or delaminate along the interface 16. As will be understood, such composite materials are characterized by very low costs which are only a little greater than the costs of the raw materials embodied in the composite material. In such composite materials, either of the metal layers is readily provided with any desired thickness and the metal layers, even when quite thin, tend to be substantially free of pores.

In the preferred embodiment of the process of this invention as illustrated in FIG. 1, the composite strip material 10 described above is cleaned in any conventional way to prepare the strip material for welding and is formed into a tubular configuration 18 in any conventional way for disposing the first metal layer 12 of the composite strip material on the exterior surface 20 of the tubular configuration 18, for disposing the lateral edges 10.1–10.2 of the composite material in juxtaposed relation to each other to form a seam 22, and for aligning corresponding edges 12.1–12.2, 14.1–14.2 and 16.1–16.2 of the metal layers and interface in the composite material with each other at the seam 22. See FIG. 2. Apparatus useful for forming such a strip material into a tubular configuration is well known and any such apparatus is utilized for this purpose within the scope of this invention. For example, in a typical apparatus of this kind, draw rolls 24 advance a strip material as indicated by the arrow 25 through a series of forming dies, diagrammatically illustrated at 26 in FIG. 1, for forming the strip material into the desired tubular configuration and for preferably forcing the lateral edges 10.1–10.2 of the strip material together with at least a small force along the seam 22. As this shaping apparatus can be of any conventional type within the scope of this invention, the strip shaping apparatus is not further described herein and it will be understood that the apparatus is adapted to form and advance the tubular configuration 18 at a rate which can be adjusted within a reasonable range, preferably from about 1 to 100 feet of tubing per minute.

In the process of this invention illustrated in FIGS. 1 and 2, the seam 22 of the tubular configuration 18 is then welded in a particular way by applying welding heat only to that surface 20 of the tubular configuration which is formed by the metal layer 12 having the relatively high fusing temperature. This welding heat is applied to this surface at the aligned edges 12.1–12.2 of the metal layer 12. For example, a conventional welding torch 28 is connected in an electrical welding circuit with the strip material 10 and is disposed as shown in FIGS. 1 and 2 for directing a welding arc onto the aligned edges 12.1–12.2 of the metal layer 12. Preferably, for example, the welding torch 28 comprises a conventional tungsten inert gas shielded welded means having a torch body 30, an electrode rod 32 of tungsten material, a flexible tubing 34 conducting an inert weld-shielding gas such as helium to be flooded onto a weld area as indicated by the arrows 36 in FIG. 2, and flexible cable means 38 electrically connecting the electrode rod 32 to an electrical power source diagrammatically illustrated at 40 in FIGS. 1 and 2. As will be understood, the welding torch means 28 also includes any conventional support means (not shown) for disposing the electrode rod 32 in selected, spaced relation to the aligned edges 12.1–12.2 of the metal layer 12. The composite strip material 10 is connected to electrical ground through the shaping die 26 or in any other conventional way, as indicated at 42 in FIG. 1, so that welding heat is adapted to be applied to the aligned edges 12.1–12.2 of the metal layer 12 by striking a welding arc between the electrode 32 and said aligned layer edges. As the welding torch means 28 can be of any conventional type within the scope of this invention, this welding apparatus is not further described herein and it will be understood that the apparatus is adapted to permit adjustment of the spacing between the electrode rod 32 and the metal layer 12 and is adapted by any conventional means to permit adjustment of the current and voltage utilized in the welding circuit above described.

In accordance with the method of this invention, the various welding parameters such as the spacing of the electrode rod 32 from the aligned edges of the metal layer 12, the welding current and voltage applied between the electrode 32 and the metal layer 12, and the rate of advance of the tubular configuration 18 past the electrode 32 are all regulated with respect to the relative thicknesses of the metal layers 12 and 14 and with respect to the thermal conductivity properties of the metals in layers 12 and 14 to produce a desired weld configuration along the seam 22. More specifically, these welding parameters are regulated by any conventional means for applying welding heat to the aligned edges of metal layer 12 at a rate and for a duration of time which is sufficient to heat the metal of layer 12 to its fusing temperature only at and adjacent to the surface 20 of the tubular configuration 18, thereby to fuse or weld the aligned edges 12.1–12.2 of the metal layer 12 togehter throughout only part of the thickness of this metal layer as indicated by the weld fusion 44 in FIG. 2. That is, the rate and duration of this application of welding heat is regulated so that the fusion of this metal of relatively high fusing temperature occurs only at one side of the aligned interface edges 16.1–16.2 within the composite material, at least a small part of the aligned edges of the metal layer 12 being left unfused in abutting relation to each other immediately adjacent to the aligned interface edges as shown at 46 in FIG. 2. In accordance with this invention, this application of welding heat is further regulated so that a sufficient part of the applied welding heat is transmitted through the material of the metal layer 12 to the metal layer 14 to heat the metal of layer 14 to its relatively lower fusing temperature for fusing the aligned edges 14.1–14.2 of this metal layer together, preferably throughout the thickness of the layer 14 as indicated by the weld fusion 48 in FIG. 2. Complete fusion of the aligned edges of the metal layer 14 is facilitated where the material of layer 14 has relatively higher thermal conductivity than the material of layer 12 as will be understood. In this arrangement, a small amount of the fused material of the metal layer 14 tends to be drawn by capillary action between the abutting but unfused edge portions of the metal layer 12 indicated at 46 for brazing these portions of the metal layer 12 to each other as will be understood, thereby to form the finished composite or clad tubing of this invention as indicated at 50 in FIGS. 1 and 2.

In this way, the novel and advantageous composite tubing 50 of this invention is provided with a secure and reliable weld 44 between edges of the metal layer 12 which is preferably formed of stainless steel. The tubing is additionally provided with a secure and reliable weld 48 between edges of the metal layer 14 which is preferably formed of copper. Each of these weld fusions is disposed at a surface of the tubing so that no cracks extend along either the interior or exterior surface of the tubing. The weld between the edges of the metal layer 14 extends throughout the thickness of the metal layer while the weld between the edges of the metal layer 12 can extend almost throughout the thickness $a$ of the metal layer 12, as indicated at $b$ in FIG. 2. Only a small portion of the metal layer 12 is left unfused but this small unfused portion prevents any substantial commingling of the stainless steel fusion 44 and the copper fusion 48, thereby to avoid any weld embrittlement such as would tend to occur if these weld fusions were permitted to flow together. Further, these small unfused portions of the edges of the metal layer 12 are securely brazed together as noted above. Thus, the tubing 50 displays high strength and is characterized by very good weld reliability and formability. Most important, the copper or other material of the layer 14 tends to be free of pores, is very securely bonded to the metal layer 12 throughout the interface 16, and can be of very substantial thickness without tending to excessively increase the cost of the tubing much beyond the cost of the raw material embodied in the metal layer 14, Further, the process of tubing manufacture is very economical.

In a typical example of the process as described with reference to FIGS. 1 and 2, the composite strip material 10 embodies a layer 12 of 409 Stainless Steel having a thickness of about 0.043 inches and a layer 14 of deoxidized high phosphorous (DHP) copper having a thickness of about 0.066 inches. In this composite material, the stainless steel layer 12 has a fusing temperature of about 2,550°F. and has a thermal conductivity of about 15.5 BTU/hr./sq.ft./ft./°F. The copper layer 14 of the composite has a fusing temperature of about 1,980 °F. and a thermal conductivity of about 196 BUT/hour/sq.ft./ft./°ft./°F. stainless steel material has a normal composition, by weight, of 0.08 percent (max.) carbon, 1.00 percent (max.) manganese, 1.00 percent (max.) silicon, 0.045 percent (max.) phosphorous, 0.045 percent (max.) sulfur, and 0.50 percent (max.) nickel with a titanium content five times said carbon content, 12.00 percent chromium and the balance iron. The copper material has a nominal composition, by weight, of 0.02 percent phosphorous and the balance copper. After conventional cleaning to prepare the strip for welding, a 4 inch wide strip of this composite material is formed into a tubular configuration of about 1.5 inches outer diameter and is advanced at a rate of about 38 inches per minute past the tungsten electrode 32 while the tungsten electrode having a diameter of about 0.187 inches is spaced about 0.012 inches from the metal layer 12 and is flooded with helium gas and while about 360 amperes are directed through the electrode 32 at 11 volts d.c., the welding heat applied to the aligned edges 12.1–12.2 of the metal layer is adapted to produce the weld configuration previously described with reference to FIGS. 1 and 2 to produce the tubing 50. As will be understood these welding parameters can be varied in a number of ways to achieve this desired weld configuration within the scope of this invention. For example, substantially the same weld configuration is achieved at 550 amperes at 11 volts d.c. when the tubing configuration is advanced at a rate of 72 inches per minute and is achieved at 600 amperes at 11 volts d.c. when the tubing configuration is advanced at about 90 inches per minute. Further, if desired, an additional weld torch means 51 of conventional type, corresponding to the torch means 28 for example, is disposed as shown in FIG. 1 and is utilized in initiating some small fusion of the edges of the metal layer 12 by way of preheating the composite material 10 prior to application of welding heat by the torch 28 in the manner above described. Many other variations of the noted welding parameters are also possible within the scope of this invention as will be understood. Preferably however it is found that, where the composite material embodies stainless steel and copper materials, best results are obtained when the thicknesses of the stainless steel and copper layers of the composite are not less than about 0.020 inches each. If desired, the composite stainless steel-copper tubing specifically described above is subjected to heat treatment as conventionally employed after welding of the noted stainless steel material for enhancing the formability of the composite tubing.

Figure 3:
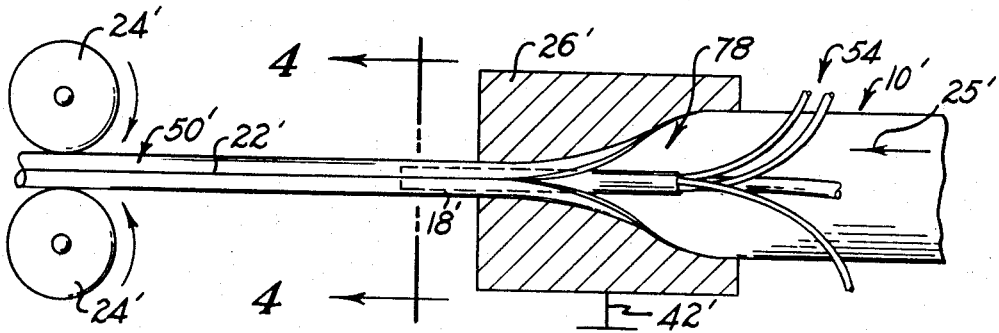
FIG. 3 is a diagrammatic view similar to FIG. 1 illustrating an alternate preferred embodiment of this invention.
Figure 4:
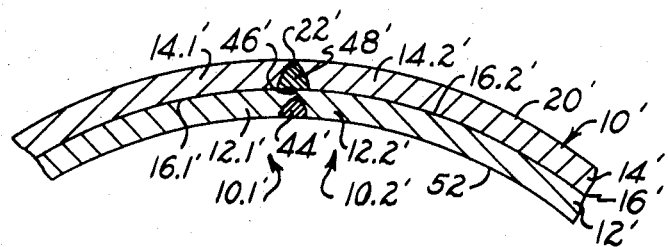
FIG. 4 is a partial section view to enlarged scale along line 4—4 of FIG. 3.

In accordance with this invention, the composite material 10' as above described is also adapted to be formed into a tubular configuration 18' as shown in FIGS. 3 and 4 by disposing the metal layer 12' of the relatively high fusing temperature material on the interior surface 52 of the tubing configuration. In this embodiment of the method of this invention, it is necessary to apply welding heat to the aligned edges 12.1'–12.2' of the metal layer 12' from inside the tubing configuration as shown in FIG. 3. For this purpose, the novel welding means 54 of this invention is preferably utilized as shown in FIGS. 3 and 5–7.

Figure 5:
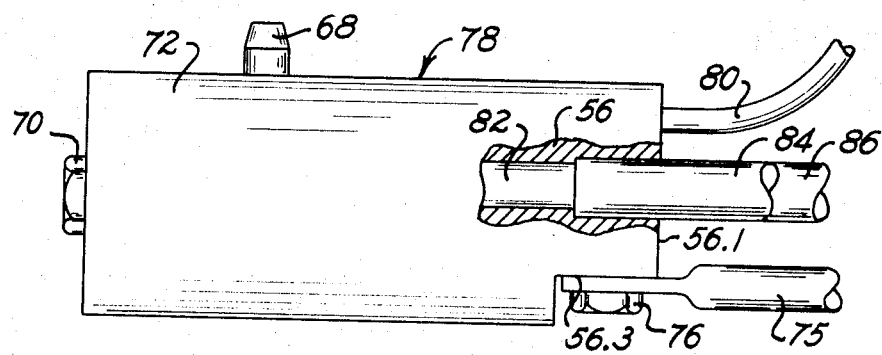
FIG. 5 is a partial side elevation view, partially in section, of a preferred embodiment of apparatus provided by this invention.
Figure 6:
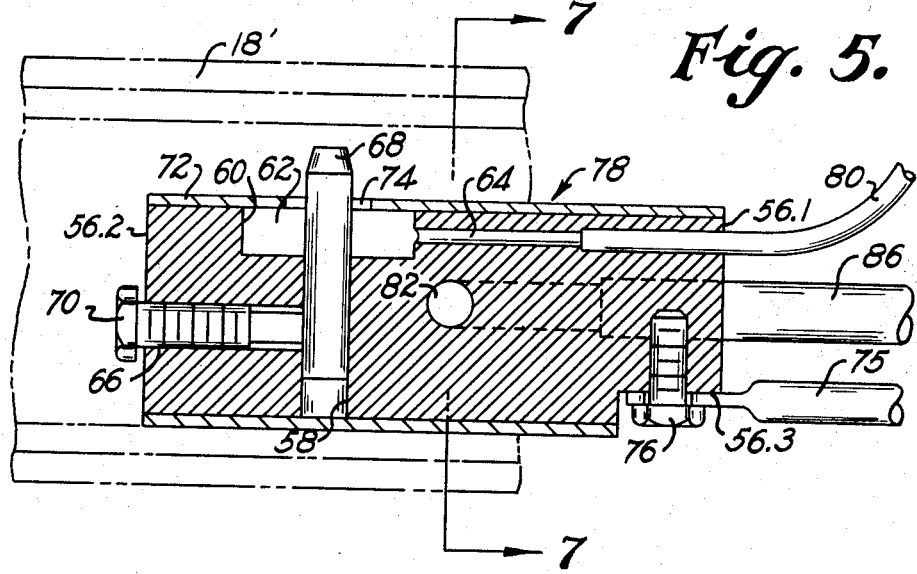
FIG. 6 is a section view along the longitudinal axis of the apparatus shown in FIG. 5.
Figure 7:
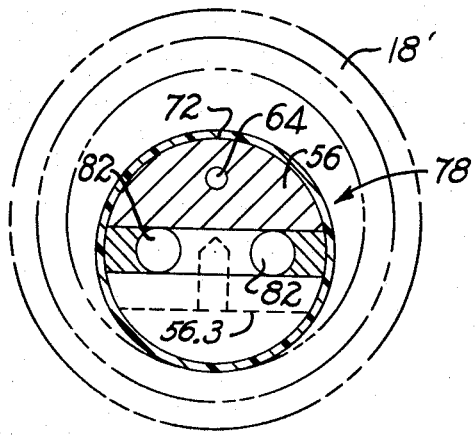
FIG. 7 is a section view along line 7—7 of FIG. 6.

As can be seen particularly by reference to FIGS. 5–7, this novel and advantageous welding means includes a welding torch 78 having a rod 56 of electrically conductive material such as copper, the rod having a diameter of about 0.750 inches and a length in the range from a few inches to several feet. The rod 56 is rpvroided with a bore 58 counterbored at 60 to form a recess 62 which opens laterally of the rod. The rod is also provided with a passage 64 extending from one end 56.1 of the rod into the recess 62 and with a threaded hole 66 opening into the bore 58 from the opposite end 56.2 of the rod. The counterbore 60 preferably has a diameter of about 0.500 inches and a depth of about 0.375 inches. An electrode rod 68 of tungsten material or the like preferably having a diameter of about 0.250 inches is then disposed in the bore 58 and is secured therein and is electrically connected to the rod 56 by a set screw 70 or the like so that the electrode rod extends from the bottom of the recess 62 into the recess in spaced relation to the walls of the recess. A sleeve 72 of electically insulating material such as epoxy-bounded fiberglass or the like is disposed in peripherally surrounding relation to the rod 56, this sleeve having an aperture 74 which is aligned with the rod recess 62. The sleeve 72, which can be quite thin on the order of 0.015 inches thick, is preferably secured to the rod 56 by a press fit or in any other conventional way and the rod 56 is preferably provided with a shoulder 56.3 to which an electrically conductive means 75 is secured by a screw 76 or by other conventional means for electrically connecting the rod 56 to a source of electrical power, thereby to form the welding torch means 78. The electrically conductive means 75 can comprise a flexible cable or a stiff conductive rod, which can also support the rod 56, as preferred. As will be understood, flexible tube means 80 or the like are connected to the passage 64 for directing an inert gas such as helium from a conventional source (not shown) into the recess 62. Preferably, the rod 56 is also provided with an additional passage 82 which extends from the rod end 56.1 longitudinally along the rod to a point adjacent to the recess 62 and which then returns to the rod end 56.1. Flexible tube means 84 and 86 connected to a conventional source (not shown) or coolant fluid such as water are then connected to the respective ends of the passage 82 for flowing the coolant fluid through the welding torch 78. In this way, the weld torch means 78 is adapted to be fitted inside the tubular configuration (indicated by the broken lines 18' in FIGS. 6 and 7) and the electrode rod 68 is adapted to be adjusted to extend from the welding torch as shown to provide a desired spacing of the electrode rod from the aligned layer edges 12.1'–12.2' of the composite material from the inside of the tubular configuration 18', thereby to apply welding heat to said aligned layer edges. See FIG. 3. In this way, by proper control or regulation of the various welding parameters as described above with reference to FIGS. 1 and 2, the tubing 50' shown in FIGS. 3 and 4 is provided with a corresponding weld configuration as shown in FIG. 4.

Figure 8:
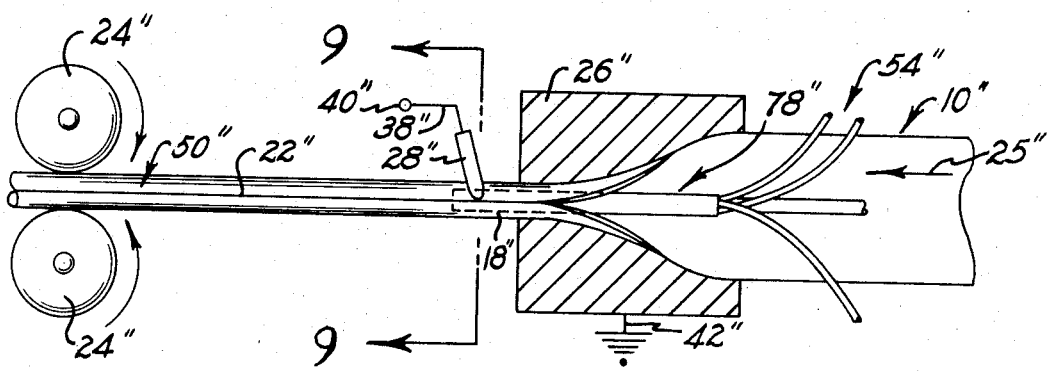
FIG. 8 is a diagrammatic view similar to FIG. 1 and FIG. 3 illustrating another alternate preferred embodiment of the method of this invention.
Figure 9:
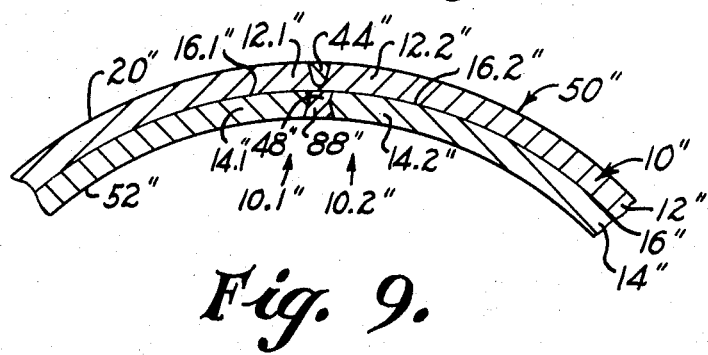
FIG. 9 is a partial section view to enlarged scale along line 9—9 of FIG. 8.

In another alternate preferred embodiment of this invention, as illustrated in FIGS. 8 and 9, welding heat is applied to the exterior and interior surfaces 20" and 52" at substantially the same time for assuring complete fusion of the aligned edges of the metal layer 14" of relatively lower fusing temperature. That is, one weld torch means 28" is utilized in the manner described with reference to FIGS. 1 and 2 to produce weld fusions 44" and 48" as illustrated in FIG. 9 while an additional weld torch means 78" comparable to the weld torch means 78 is utilized to apply welding heat to the composite material 10" from inside the tubing configuration for producing the additional weld fusion 88 as shown in FIG. 9, thereby to assure complete fusion of the edges of the metal layer 14".

It should be understood that although preferred embodiments of the tubing, methods, and apparatus of this invention have been described by way of illustrating the inventions, these inventions include all modifications and equivalents of the disclosed embodiments falling within the scope of the appended claims.

We claim:

1. A welded element comprising two portions of a composite metal material each embodying a layer of a first metal having a selected fusing temperature and a layer of a second metal having a relatively lower fusing temperature, said metal layers having a metallurgical bond therebetween extending along an interface between said metal layers, said composite material portions having edges thereof disposed in juxtaposed relation to each other so that corresponding edges of layers of the same metals and edges of said interfaces of said composite material portions are aligned with each other at said edges, said composite material portions having said first metal layers thereof fused together at said edges at one side of said aligned interfaces at a location spaced from said aligned interfaces and having said second metal layers thereof fused together at said edges at the opposite side of said aligned interfaces.

2. A welded tube comprising composite metal material embodying a layer of a first metal having aselected fusing temperature and a layer of a second metal having a relatively lower fusing temperature, said metal layers having a metallurgical bond therebetween extending along an interface between said metal layers, said composite material being arranged in a tubular configuration with edges of said composite material disposed in juxtaposed relation to each other so that corresponding edges of said layers of the same metals and edges of said interface of said composite material are aligned with each other at said edges of said composite material, said composite material having said edges of said first metal layer fused together at one side of said aligned edges of said interface at a location spaced from said aligned edges of said interface and having said edges of said second metal layer fused together at the opposite side of said aligned edges of said interface for securing said composite material in said tubular configuration.

3. A welded tube as set forth in claim 2 wherein said edges of said first metal layer have portions thereof disposed in abutting relation to each other adjacent said aligned edges of said interface and wherein fused material of said second metal is disposed between and brazed to said abutting portions of said edges of said first metal layer for securing said portions of said edges of said first metal layer to each other.

4. A welded tube as set forth in claim 2 wherein said first metal comprises stainless steel and said second metal comprises copper.

5. A welded tube as set forth in claim 4 wherein said composite material is arranged in said tubular configuration with said first metal layer disposed on the exterior of said tubular configuration.

6. A welded tube as set forth in claim 4 wherein said composite material is arranged in said tubular configuration with said second metal layer disposed on the exterior of said tubular configuration.

7. A welded tube comprising an elongate strip of composite metal material embodying a layer of stainless steel having a thickness of at least about 0.025 inches and having a selected fusing temperature and embodying a layer of copper material having a relatively lower fusing temperature, said layers having a metallurgical bond therebetween extending along an interface between said layers, said strip of composite material being arranged in a tubular configuration with edges of said strip disposed in juxtaposed relation to each other so that corresponding edges of said layers of the same metals and edges of said interface are aligned with each other at said edges of said strip, said composite strip material having said edges of said stainless steel layer fused to each other at one side of said aligned interface edges only at a location spaced from said aligned interface edges and having portions of said stainless steel layers immediately adjacent said aligned interface edges disposed in abutting relation to each other, said composite strip material having said edges of said copper material layer fused together at the opposite side of said aligned interface edges at a location immediately adjacent to said aligned interface edges and extending throughout said aligned edges of said copper material layer, said abutting portions of said edges of said stainless steel layer being brazed to each other with said copper material.

8. A method for welding two portions of a composite metal material together where each composite material portion embodies a layer of a first metal having a selected fusing temperature and a layer of a second metal having a relatively lower fusing temperature and where said metal layers having a metallurgical bond therebetween extending along an interface between said layers, said method comprising the steps of disposing edges of said composite material portions in juxtaposed relation to each other so that corresponding edges of said layers of the same metals and edges of said interfaces of said composite material portions are aligned with each other at said edges, and applying welding heat to said edges of said composite material while regulating application of said heat with respect to the thermal conductivities and fusing temperatures of said first and second metals for fusing said edges of said first metal layers to each other at one side of said aligned interface edges at a location spaced from said aligned interface edges and for fusing said edges of said second metal layers to each other at the opposite side of said aligned interface edges.

9. A method for making a clad metal tubing of a composite metal material having a layer of a first metal of selected fusing temperature and a layer of a second metal of relatively lower fusing temperature, said metal layers having a metallurgical bond therebetween extending along an interface between said layers, said method comprising the steps of arranging said composite metal material in a tubular configuration with edges thereof disposed in juxtaposed relation to each other so that corresponding edges of said metal layers of the same metal materials and edges of said interface are aligned with each other at said juxtaposed edges of said composite material, and applying welding heat to said aligned edges of said first metal layer at a selected rate and for a selected period of time at a location spaced from said aligned edges of said interface for fusing said aligned edges of said first metal layer to each other at one side of said aligned interface edges only at a location spaced from said aligned interface edges and for fusing said aligned edges of said second metal layer to each other at the opposite side of said aligned interface edges at a location immediately adjacent to said aligned interface edges.

10. A method for making a clad metal tubing as set forth in claim 9 wherein said first metal comprises stainless steel and said second metal comprises copper and wherein said welding heat is applied to said aligned edges of said first metal layer by directing electrical current between a rod of tungsten material and said aligned edges of said first metal layer while said edges are shielded by directing inert gas upon said aligned edges of said first metal layer.

11. A method for making a clad metal tubing as set forth in claim 9 wherein heat is applied to said aligned edges of said first metal layer prior to said application of said welding heat thereto for preheating said juxtaposed edges of said composite material.

12. A method for making a clad metal tubing as set forth in claim 9 wherein said composite material is arranged in said tubular configuration with said first metal layer disposed on the exterior of said tubular configuration.

13. A method for making a clad metal tubing as set forth in claim 9 wherein said composite material is arranged in said tubular configuration with said second metal layer disposed on the exterior of said tubular configuration.

14. A method for making a clad metal tubing as set forth in claim 9 wherein welding heat is also applied to said aligned edges of said second metal layer at a selected rate and for a selected period of time at a location spaced from said aligned interface edges for facilitating fusing of said edge of said second metal layer at a location spaced from said aligned interface edges while avoiding fusing of said edges of said first metal layer to each other at a location immediately adjacent said aligned interface edges.

15. A method for making a clad metal tubing of an elongate strip of composite metal material embodying a layer of stainless steel having a thickness of at least about 0.025 inches and having a selected fusing temperature ane embodying a layer of copper material having a relatively lower fusing temperature, said layers having a metallurgical bond therebetween extending along an interface between said layers, said method comprising the steps of bending said strip material into a tubular configuration progressively along the length thereof for disposing lateral edges of said strip in juxtaposed relation to each other so that corresponding edges of said layers of metals of the same materials and edges of said interface are aligned with each other at said juxtaposed strip edges, and applying welding heat to said aligned edges of said stainless steel layer progressively along the length of the strip material, said welding heat being applied to said edges of said stainless steel layer at locations spaced from said aligned interface edges and being applied at a rate and for a period of time sufficient for fusing said aligned edges of said stainless steel layer to each other at one side of said aligned interface edges only at a location spaced from said aligned interface edges while also fusing said aligned edges of said copper material layer at the opposite side of said aligned interface edges at a location immediately adjacent to said aligned interface edges and throughout said aligned edges of said copper material layer to secure said strip material in said tubular configuration and to flow said copper material from said copper material layer between said aligned edges of said stainless steel layer adjacent said aligned interface edges for also brazing portions of said edges of said stainless steel layer to each other.

16. A method as set forth in claim 15 wherein said strip material is bent into said tubular configuration disposing said stainless steel layer of said strip material on the exterior of said tubular configuration and wherein said welding heat is applied to said aligned edges of said stainless steel layer from the exterior of said tubular configuration.

17. A method as set forth in claim 15 wherein said strip material is bent into said tubular configuration disposing said stainless steel layer of said strip material in the interior of said tubular configuration and wherein said welding heat is applied to said aligned edges of said stainless steel layer from the interior of said tubular configuration.

* * * * *